(12) United States Patent
Miyamoto et al.

(10) Patent No.: US 7,676,373 B2
(45) Date of Patent: *Mar. 9, 2010

(54) DISPLAYING TEXT OF SPEECH IN SYNCHRONIZATION WITH THE SPEECH

(75) Inventors: Kohtaroh Miyamoto, Fuchu (JP); Midori Shoji, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,665

(22) Filed: Jun. 2, 2008

(65) Prior Publication Data

US 2008/0294431 A1  Nov. 27, 2008

(51) Int. Cl.
*G10L 21/06* (2006.01)
*G10L 15/00* (2006.01)
(52) U.S. Cl. .................. 704/276; 704/231
(58) Field of Classification Search ............ 707/501; 704/231, 276; 348/468
See application file for complete search history.

(56) References Cited

U.S. PATENT DOCUMENTS

| 6,219,453 | B1 * | 4/2001 | Goldberg | 382/229 |
| 6,473,778 | B1 * | 10/2002 | Gibbon | 715/201 |
| 2003/0049015 | A1 * | 3/2003 | Cote et al. | 386/54 |

* cited by examiner

*Primary Examiner*—Angela A Armstrong
(74) *Attorney, Agent, or Firm*—Wolf, Greenfield & Sacks, P.C.

(57) ABSTRACT

Displays a character string representing content of speech in synchronization with reproduction of the speech. An apparatus includes: a unit for obtaining scenario data representing the speech; a unit for dividing textual data resulting from recognition of the speech to generate pieces of recognition pieces of recognition data; a unit for detecting in the scenario data a character matching each character contained in each piece of recognition data for which no matching character string has been detected to detect in the scenario data a character string that matches the piece of recognition data; and a unit for setting the display timing of displaying each of character strings contained in the scenario data to the timing at which speech recognized as the piece of recognition data that matches the character string is reproduced.

17 Claims, 17 Drawing Sheets

Scenario data

We can clearly acknowledge a rapid growth in the IT industry. Let's review the details.

Figure 3

| Recognition time point | Recognition data | |
|---|---|---|
| 02. 103 | Weed can | 30-1 |
| 03. 211 | clean lie | 30-2 |
| 05. 235 | acknowledge | 30-3 |
| 06. 456 | array | 30-4 |
| 08. 387 | growth in | 30-5 |
| 11. 125 | the IT | 30-6 |
| 16. 887 | industry. | 30-7 |
| 17. 001 | Let's view | 30-8 |
| 18. 051 | the details. | 30-9 |
| ⋮ | ⋮ | |
| XX | XX | 30-N |

| Display time point | Character string |
|---|---|
| 02. 103 | We can clearly acknowledge a rapid |
| 08. 387 | growth in the IT industry. |
| 16. 887 | Let's review the details. |

| Previous-but-one piece of recognition data | Previous piece of recognition data | Current piece of recognition data | Operation |
|---|---|---|---|
| ○/× | ○ | ○ | Determine that there is a match for the current piece of recognition data |
| | | × | Hold |
| ○ | × | ○ | Determine that there is a match for the previous piece of recognition data |
| | | × | Hold or, for the last piece of recognition data, perform last character comparison |
| × | × | ○ | Find characters that match characters in the previous-but-one and previous pieces of recognition data (range is defined). If reliability is lower than a reference value, set a reevaluation flag (△) |
| | | × | Find a character that matches characters contained in the previous-but-one and previous recognition data (range is not defined) |
| × | △ | ○ | Determine that there is a match for the previous piece of recognition data |
| | | × | Determine that there is no match for the previous piece of recognition data |

Figure 9

| First character | Previous character | Current character | Operation |
|---|---|---|---|
| ○/× | ○ | ○ | Determine there is a match for the current character |
| | | × | Hold |
| ○ | × | ○ | Assume there are matches for characters in recognition data for which no matching characters have been found |
| | | × | Hold |
| × | | ○ | Determine there is a match for the current character |
| | | × | Hold |

| First character | Next recognition data | Operation |
|---|---|---|
| ○ | ○ | Determine there is a match for the current recognition data |
| ○ | × | First character is identified and a detection process for an unidentified phoneme in the next recognition data is performed |
| × | ○ | First character is not identified and a detection process for an identified phoneme in the next recognition data is performed |
| × | × | First character is not identified and a detection process for an unidentified phoneme in the next recognition data is performed |

| First character | Previous phoneme | Current phoneme | Operation |
|---|---|---|---|
| ○/× | ○ | ○ | Determine there is a match for the phoneme |
|  |  | × | Hold the process or address the next candidate phonetic representation |
| ○ | × | ○ | Regard an unmatched character in recognition data as a match |
|  |  | × | Hold the process or address the next candidate phonetic representation |
| × |  | ○ | Determine there is a match for the phoneme |
|  |  | × | Hold the process or address the next candidate phonetic representation |

| First character | Next or last recognition data | Operation |
|---|---|---|
| ○ | ○ | Determine an unmatched character in recognition data as a match |
| | × | Hold |
| × | ○ | Forced allocation |
| | × | Hold |

US 7,676,373 B2

DISPLAYING TEXT OF SPEECH IN SYNCHRONIZATION WITH THE SPEECH

FIELD OF THE INVENTION

The present invention relates to a setting apparatus, a program, a recording medium, and a setting method that control a process for displaying text of speech in synchronization with the speech.

BACKGROUND

As the performance of information technology devices has been dramatically improved in recent years and more computer networks such as broadband networks have come into service, distribution of digital content such as video content has become popular. Video content are comprehensible to users and convincing compared with static content such as text. As cable and communication satellite television broadcasting is coming into widespread use, more television channels become available. It is expected that videos will be widely used in various application domains.

To appropriately provide information in video images to more users, it is necessary to display captions representing content of speech. A study group in Japan has set a goal of captioning 100 percent of telecast videos by 2007. Accordingly, advances in the technology of applying proper captions to video are social demands.

The following documents are considered:
[Patent document 1] Published Unexamined Patent Application No. 10-254478.
[Patent document 2] Published Unexamined Patent Application No. 2000-89786.
[Patent document 3] Published Unexamined Patent Application No. 10-136260.
[Non-patent document 1] Seigo Tanimura et al., "Automatic Alignment of a Sound Track to a Script in a TV Drama" (Natural Language Processing, 26-4, May 28, 1999).

Methods have been proposed for generating captions by using speech recognition technology in which speech is recognized and character strings representing content of the speech are generated. However, speech recognition technology can make speech recognition errors and consequently reproduce false character strings. Furthermore, speech recognition technology cannot appropriately display punctuation marks and symbols because they are not orally expressed. Therefore, speech recognition technology cannot directly be applied to caption generation and modifications are made to results of speech recognition to generate captions (See patent document 2).

Another method has been proposed in which the script of speech in videos is divided into character strings of appropriate lengths and they are displayed at proper timing. However, even with the aid of sophisticated video editing software, it is difficult to manually determine the proper timing. Therefore, techniques have been proposed in which reproduced speech is compared with a script to determine the time point at which each character string in the script should be displayed (See patent documents 1 and 3). Non-patent document 1 will be described later.

The techniques described in patent documents 1 and 3 first analyze speech and assume a period during which no utterance has appeared to be a break between sentences. Then, the phoneme at the beginning of a sentence, which was obtained through speech analysis, is compared with the phoneme at the beginning of each of the sentences in the script to produce the correspondence between speech and the script text. This correspondence shows that each sentence in the script should be displayed at the time point at which speech corresponding to that sentence is sounded out.

However, a duration during which no utterance appears is not necessarily a break between sentences. For instance, a speaker can make pauses when hesitating, being puzzled, breathing or momentarily thinking, or for emphasis, or various other situations. Therefore, it is difficult to properly identify a break between sentences and find speech corresponding to each sentence in a script by using the above technologies. If speech and display of captions do not coincide, problems will arise that no caption is displayed when a speaker has started speaking, or the answer to a quiz may be displayed before a speaker starts to speak.

Moreover, because these technologies directly display each sentence in a script as a caption without modification, sentences cannot be divided or combined with consideration given to readability to users or the size of a display screen. Furthermore, the technologies generate similar captions regardless of the accuracy of speech recognition, therefore they will be unable to improve the accuracy of captioning even if the accuracy of speech recognition will increase in the future.

SUMMARY OF THE INVENTION

In view of this, an object of the present invention is to provide a setting apparatus, program, recording medium, and method that can solve these problems. To solve the above problems, the present invention provides a setting apparatus, a setting method using the setting apparatus, a program for causing a computer to function as the setting apparatus, and a recording medium on which the program is recorded, for setting the timing of displaying text of speech in synchronization with reproduction of the speech, the text of the speech being predetermined. An example of a setting apparatus comprising: a scenario data obtaining unit for obtaining scenario data representing the content of the speech; a speech recognition unit for dividing textual data resulting from recognition of the speech being reproduced to generate a plurality of pieces of recognition data; a character string detection unit for detecting in the scenario data a character string that matches each of the plurality of pieces of recognition data; a character detection unit for detecting in the scenario data a character that matches each of characters contained in each piece of recognition data for which no matching character string has been detected by the character string detection unit to detect in the scenario data a character string that matches the piece of recognition data; and a display setting unit for setting the display timing of displaying each of character strings contained in the scenario data to the timing at which speech recognized as the piece of recognition data that matches the character string is reproduced. Thus, according to the present invention, character strings that represent content of speech can be displayed in synchronization with the reproduction of that speech.

BRIEF DESCRIPTION OF THE FIGURES

These and other aspects, features, and advantages of the present invention will become apparent upon further consideration of the following detailed description of the invention when read in conjunction with the drawing figures, in which:

FIG. 2 shows an example of scenario data 20;

FIG. 3 shows an example of recognition data 30-1 to 30-N;

FIG. 4 shows an example of display timing information 40;

FIG. 7 shows details of operations performed at S620;

FIG. 9 shows details of a first set of operations performed at S810;

FIG. 10 shows details of a second set of operations performed at S810;

FIG. 11 shows details of a first set of operations performed at S830;

FIG. 12 shows details of a second set of operations performed at S830;

DESCRIPTION OF SYMBOLS

Figure 1:
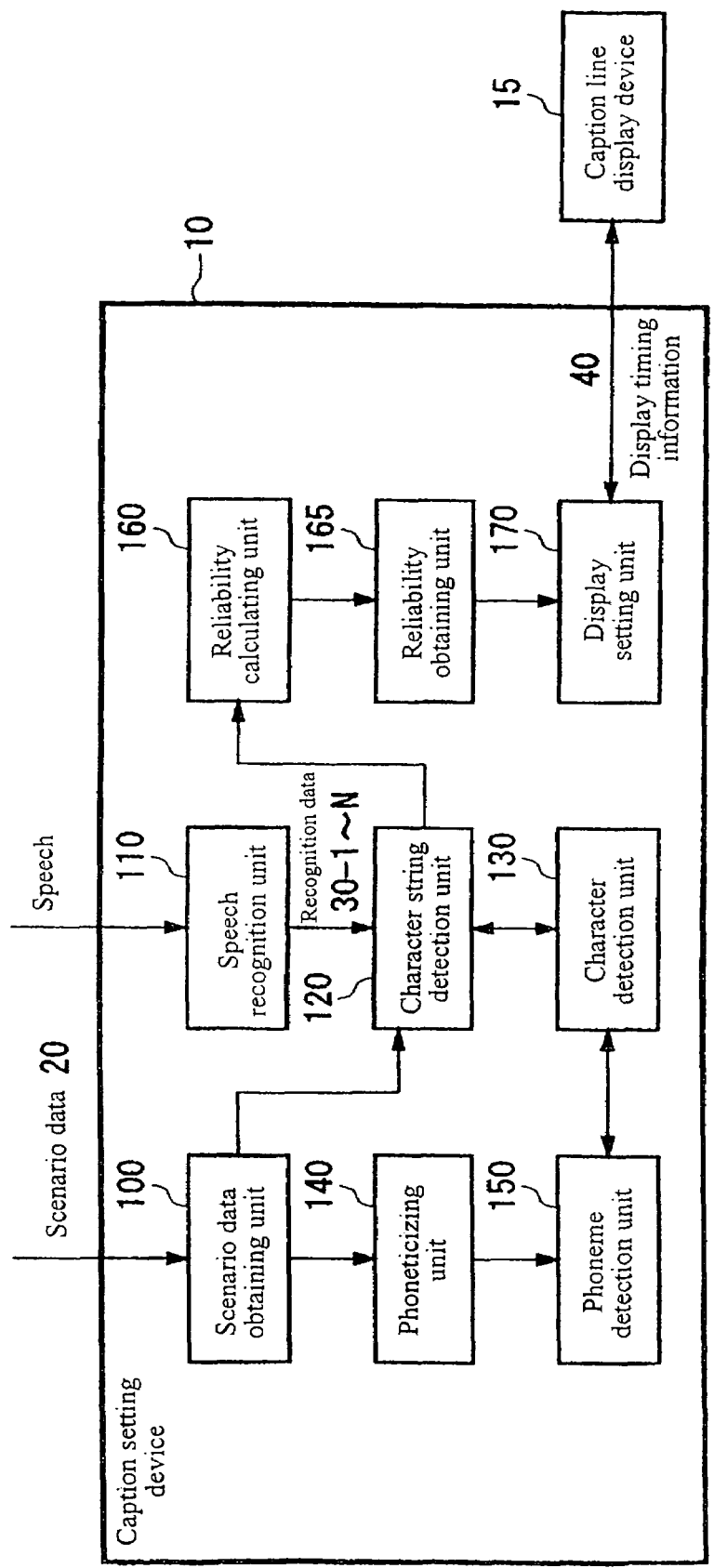
FIG. 1 is a functional block diagram of a caption setting device 10.

10 . . . Caption setting device
15 . . . Caption line display device
20 . . . Scenario data
30 . . . Recognition data
40 . . . Display timing information
100 . . . Scenario data obtaining unit
110 . . . Speech recognition unit
120 . . . Character string detection unit
130 . . . Character detection unit
140 . . . Phoneticizing unit
150 . . . Phoneme detection unit
160 . . . Reliability calculating unit
165 . . . Reliability obtaining unit
170 . . . Display setting unit

DETAILED DESCRIPTION OF THE INVENTION

The present invention provides a setting apparatus, a setting method using the setting apparatus, a program for causing a computer to function as the setting apparatus, and a recording medium on which the program is recorded, for setting the timing of displaying text of speech in synchronization with reproduction of the speech, the text of the speech being predetermined. An example of a setting apparatus comprising: a scenario data obtaining unit for obtaining scenario data representing the content of the speech; a speech recognition unit for dividing textual data resulting from recognition of the speech being reproduced to generate a plurality of pieces of recognition data; a character string detection unit for detecting in the scenario data a character string that matches each of the plurality of pieces of recognition data; a character detection unit for detecting in the scenario data a character that matches each of characters contained in each piece of recognition data for which no matching character string has been detected by the character string detection unit to detect in the scenario data a character string that matches the piece of recognition data; and a display setting unit for setting the display timing of displaying each of character strings contained in the scenario data to the timing at which speech recognized as the piece of recognition data that matches the character string is reproduced.

According to the present invention, character strings that represent content of speech can be displayed in synchronization with the reproduction of that speech. The present invention will be described with respect to an embodiment of the present invention. The embodiment is not intended to limit the present invention which is defined in the claims and not all of the combinations of features described in the embodiment are prerequisite to the inventive solution. For example, a simple method may be envisioned in which some processes are performed as a batch operation by using partial or full weighting.

FIG. 1 is a functional block diagram of a caption setting device 10. The purpose of the caption setting device 10 is to set the timing of displaying predetermined text of speech included in a video as captions on a caption line display device 15 in synchronization with the reproduction of the video. The caption setting device 10 includes a scenario data obtaining unit 100, a speech recognition unit 110, a character string detection unit 120, a character detection unit 130, a phoneticizing unit 140, a phoneme detection unit 150, a reliability calculating unit 160, a reliability obtaining unit 165, and a display setting unit 170.

The scenario data obtaining unit 100 obtains scenario data 20 representing the content of speech. The speech recognition unit 110 captures speech spoken by a human speaker through a microphone to recognize the speech. Any of various existing technologies may be used for the speech recognition. The speech recognition unit 110 divides textual data resulting from the speech recognition into pieces of recognition data. Let the plurality of pieces of recognition data generated be 30-1 to 30-N. It is desirable that each of the pieces of recognition data 30-1 to 30-N be associated with the time point at which it has been recognized through speech recognition. The speech recognition unit 110 sends the generated pieces of recognition data 30-1 to 30-N to the character string detection unit 120.

The character string detection unit 120 detects in the scenario data 20 a character string that matches each piece of recognition data 30-1 to 30-N and sends it to the reliability calculating unit 160. The character string detection unit 120 may detect a matching character string on the basis of the result of detection received from the character detection unit 130. The character detection unit 130 detects in the scenario data 20 a character that matches each of the characters contained in each piece of recognition data for which no matching character string has been detected by the character string detection unit 120 to detect in the scenario data 20 a character string that matches the piece of recognition data. The character detection unit 130 may detect a character including phonemes in the scenario data 20 as the character that matches a character in which the matching phonemes have been detected by a phoneme detection unit 150. The character detection unit 130 then sends the detection result to the character string detection unit 120.

A phoneticizing unit 140 generates candidate phonetic representations of scenario data 20. The phoneticizing unit 140 may generate each of candidate phonetic representations together with information indicating the likelihood that the candidate phonetic representation will be sounded out. The phoneme detection unit 150 converts each of characters in the recognition data 30-1 to 30-N for which no matching characters have been found by the character detection unit 130 into phonemes including phonetic representations of the character. For example, the phoneme detection unit 150 may convert a kanji-character into hiragana-characters representing a phonetic representation of the kanji-character.

The phoneme detection unit 150 then finds, from among the candidate phonetic representations generated by the phoneticizing unit 140, phonemes that match phonemes included in a phonetic representation of each of characters in the recognition data 30-1 to 30-N for which no matching characters were found by the character detection unit 130. For a character for which the phoneme detection unit 150 found no matching phoneme, the phoneme detection unit 150 may detect a matching character on the basis of the duration of the sound output of phonemes included in that character. The phoneme detection unit 150 then sends the result of detection to the character detection unit 130.

The reliability calculating unit 160 calculates the reliability for each piece of recognition data 30-1 to 30-N that represents the likelihood that the piece of recognition data will match a character string. The reliability here is the likelihood that speech containing a character string that matches a piece of recognition data will be reproduced at the time point when the piece of recognition data is recognized through speech recognition. The reliability calculating unit 160 may produce a higher reliability for a piece of recognition data for which a matching character string has been found by the character string detection unit 120 alone than for a piece of recognition data for which a matching character has been found by both the character string detection unit 120 and the character detection unit 130. The reliability calculating unit 160 then sends each character string in the scenario data 20 along with its reliability to the reliability obtaining unit 165.

The reliability obtaining unit 165 obtains, in connection with each character string, the reproduction time point at which the character string should be displayed, that is, the time point at which speech recognized as recognition data that matches the character string will be reproduced from the speech recognition unit 110 through the character string detection unit 120. The reliability obtaining unit 165 also obtains the reliability, which is the likelihood that speech containing the character string will be reproduced at the reproduction time point, from the reliability calculating unit 160.

The display setting unit 170 sets display timing at which each of the character strings included in the scenario data 20 should be displayed to the reproduction time point at which the speech recognized as the recognition data that matches that character string will be reproduced. For example, the display setting unit 170 may provide display timing information 40, indicating association of the time point at which a character string should be displayed with the character string, to the caption line display device 15 or may store the information in a database accessible to the caption line display device 15. The display setting unit 170 may also obtain information about settings for captions to be displayed from the caption line display device 15 and concatenate character strings according to the obtained setting information. The setting information is information such as the number of characters that can be displayed on one line on the display screen of the caption line display device 15 or information indicating whether or not a new line should be started after a punctuation mark in a caption.

FIG. 2 shows an example of scenario data 20. The scenario data 20 includes the text of speech, including character strings consisting of alphabetic letters and punctuation marks. Unlike approaches that directly use results of speech recognition, this approach can use the scenario data 20 to generate appropriate captions including marks which are not sounded out. An example will be described below in which the scenario data 20 is the sentence: "We can clearly acknowledge a rapid growth in the IT industry. Let's review the details."

FIG. 3 shows an example of recognition data 30-1 to 30-N. The speech recognition unit 110 generates each piece of recognition data 30-1 to 30-N in connection with recognition time point at which the piece of recognition data has been recognized. The recognition time point here represents a lapse of time between the time point at which reproduction of speech started and the time point of reproduction of the portion of the speech that is recognized as the recognition data. The speech recognition unit 110 generates a character string, "Weed can" as recognition data 30-1 and generates its recognition time point "02.103" in association with the recognition data 30-1.

Comparing FIG. 3 with FIG. 2, it can be seen that the speech recognition unit 110 generated a false character strings different from the scenario data 20 as the result of speech recognition. The caption setting device 10 in the present embodiment can set an appropriate display timing despite the false speech recognition.

FIG. 4 shows an example of display timing information 40. The display setting unit 170 generates display timing information 40 indicating character strings to be displayed and, in association, display time points at which they should be displayed, and sets the information in the caption line display device 15. A display time point here represents a lapse of time between the start of reproduction of speech and the time point at which the corresponding character string should be displayed. For example, the display setting unit 170 generates information associating the character string "We can clearly acknowledge a rapid" with the timestamp "02. 103," which is an exemplary display time point.

The character string "We can clearly acknowledge a rapid" corresponds to a set of pieces of recognition data 30-1 to 30-4. In this way, the display setting unit 170 not only sets display time points but also concatenates character strings as appropriate.

Figure 5:
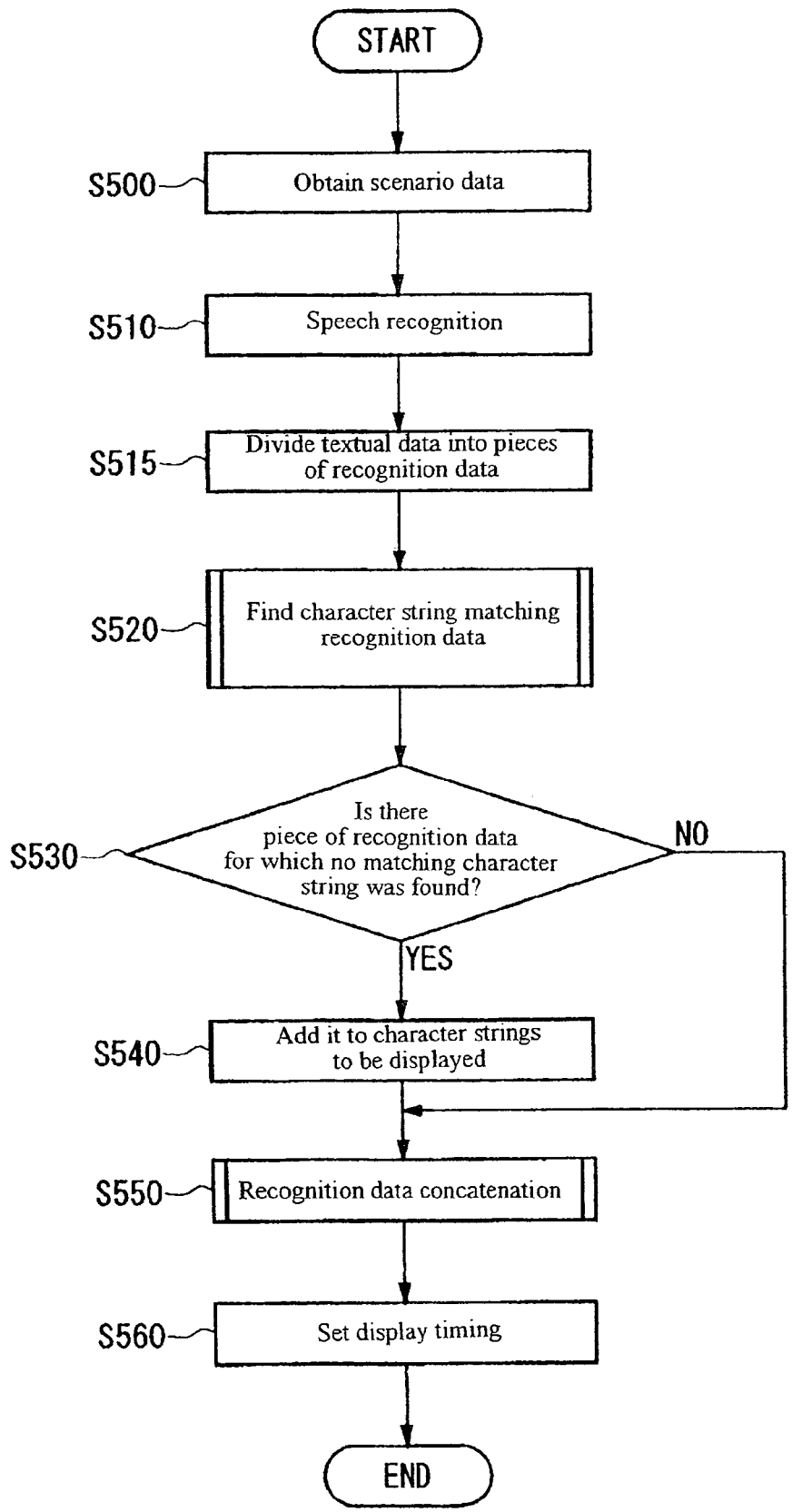
FIG. 5 shows a flow of a process performed by the caption setting device 10 for setting display timing.

FIG. 5 shows a flow of a process performed by the caption setting device 10 for setting a display timing. The scenario data obtaining unit 100 obtains scenario data 20 representing content of speech (S500). The scenario data obtaining unit 100 may select the scenario data according to an instruction from a user. The speech recognition unit 110 recognizes speech reproduced (S510) and divides the textual data it recognized into pieces of recognition data 30-1 to 30-N (S515). The speech recognition unit 110 may divide the data every a predetermined number of words, for example 1 to 3 words, or may separate the data at predetermined intervals, for example 1.5 seconds.

Alternatively, the speech recognition unit 110 may regard a silent period of a predetermined length, for example 100 milliseconds or more, as a boundary in recognition data. Preferably, the speech recognition unit 110 should divide textual data into as small semantic units as possible, such as words, phrases, or clauses of a sentence. This can increase the generation precision of timestamps. This divide process by the speech recognition unit 110 is called the divide speech recognition line process.

Also preferably, the speech recognition unit 110 should further generate a speech recognition certainty factor for each piece of speech recognition data that indicates the possibility that recognition data 30-1 to 30-N recognized through speech recognition will match the content of speech reproduced. The speech recognition unit 110 may also select textual data to be divided from among pieces of textual data produced through speech recognition according to an instruction from a user.

Then, the character string detection unit 120 detects in scenario data 20 a character string that matches each piece of recognition data 30-1 to 30-N (S520). In this process, the character detection unit 130 may find in the scenario data 20 a character that matches each of the characters contained in the recognition data as appropriate. The character string detection unit may also find phonemes in the scenario data 20 that match phonemes contained in a character in the recognition data 30-1 to 30-N for which no matching character was found by the character detection unit 130. This will be detailed later.

The display setting unit 170 determines whether or not there is any piece of recognition data for which no matching character string was found by the character string detection unit 120 (S530). If there is such a piece of recognition data (S530: YES), then the display setting unit 170 adds the piece of recognition data for which no matching character string was found in the scenario data 20 by the character string detection unit 120 to a set of character strings to be displayed so that it is also displayed during reproduction of the speech (S540).

The display setting unit 170 obtains setting information about captions to be displayed from the caption line display device 15 and concatenates character strings according to the setting information (S550). The display setting unit 170 may perform this concatenation before the captions are displayed or may perform it dynamically in response to a caption display instruction from the caption line display device 15. This setting information allows the display setting unit 170 to generate appropriate captions according to the information such as the dimensions of the display screen of the caption line display device 15. Hereafter, the concatenation by the display setting unit 170 will be referred to as the optimum caption line display process. The display setting unit 170 then sets the timing of displaying each of the character strings contained in the scenario data 20 to the reproduction time point of the speech recognized as recognition data that matches the character string (S560).

Figure 6:
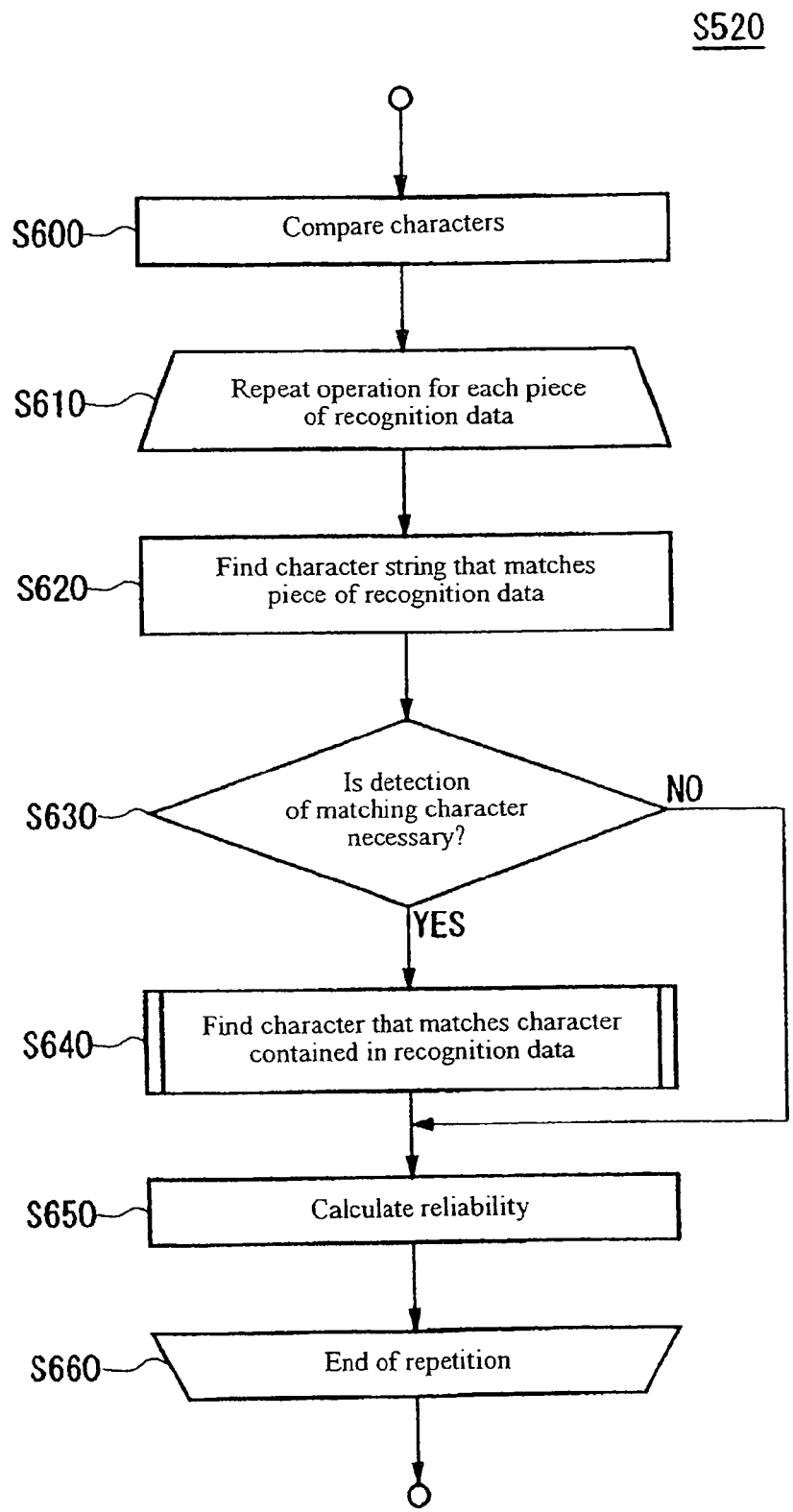
FIG. 6 shows details of operations performed at S520.

FIG. 6 shows details of an operation performed at S520. The character string detection unit 120 first finds in the scenario data 20 a character that matches each of the characters contained in each piece of the recognition data 30-1 to 30-N (S600). For such detection, DP matching, which is an effective detection method, has been proposed (see non-patent document 1). The character string detection unit 120 may perform the detection by using the DP matching or any other methods. The character string detection unit 120 may generate an optimal matching path, which is a graph in which the characters in the scenario data 20 are sequentially arranged on the vertical axis, the pieces of recognition data 30-1 to 30-N are sequentially arranged on the horizontal axis, and the path passes through the points at which the characters in the scenario data 20 match the characters in the recognition data 30-1 to 30-N.

The character string detection unit 120 performs the following operation for each piece of the recognition data 30-1 to 30-N in order to find again the character string that matches each piece of the recognition data 30-1 to 30-N (S610). In the present embodiment, the character string detection unit 120 performs the following operation for a plurality of pieces of recognition data in the order in which they were recognized, that is, in the order in which they were reproduced as speech. Alternatively, the character string detection unit 120 may perform the following process for the pieces of recognition data in descending order of speech recognition certainty factor, that is, the piece of recognition data with the highest speech recognition certainty factor first.

The character string detection unit 120 finds in the scenario data 20 a character string that matches the piece of recognition data (S620). Then, the character string detection unit 120 determines whether it is necessary to detect a character that matches a piece of recognition data for which no matching character string was found (S630). If necessary (S630: YES), then the character detection unit 130 finds a character that matches a character contained in the piece of recognition data (S640). This recursive process in which the scaling level is gradually increased for finding characters that match partial data included in data or a set of character strings for which no matching character strings were found is referred to as the up-scaling process in the present embodiment.

Then, the reliability calculating unit 160 calculates the reliability of each piece of recognition data 30-1 to 30-N, which is the likelihood that the piece of recognition data will match a character string (S650). For instance, the reliability calculating unit 160 may produce a higher reliability for a piece of recognition data for which a matching character string has been detected by the character string detection unit 120 alone than for a piece of recognition data for which a matching character string has been found by both the character string detection unit 120 and the character detection unit 130.

The reliability calculating unit 160 also compares recognition data including characters for which matching phonemes were found by the phoneme detection unit 150 with recognition data for which no phonemes were found by the phoneme detection unit 150 but for which a matching character was found by the character detection unit 130, and produces a lower reliability. That is, it produces a lower reliability as the level of the up-scaling process rises. This enables lower reliabilities to be generated for recognition data that can entail an error in that phonemes found in mismatching characters match accidentally.

The caption setting device 10 repeats the above-described process for each piece of recognition data (S660).

As shown in FIG. 6, before performing the process for detecting in the scenario data 20 a character string that matches each piece of recognition data, the character string detection unit 120 determines by DP matching of a high detection accuracy whether there is a match at the character level. The character string detection unit 120 finds in the scenario data 20 a character string again that matches a piece of recognition data for which a matching character was detected by DP matching. Consequently, the accuracy of detecting a matching character can be increased and it can be determined whether a match is found at the recognition-data or character level. Alternatively, matching at the character level, such as DP matching, by the character string detection unit 120 may be omitted.

FIG. 7 shows details of an operation performed at S620. The character string detection unit 120 first finds in the scenario data 20 a character string that matches the current piece of recognition data for which a match is to be detected. Then, the character string detection unit 120 performs the following process based not only on whether a character matching the current piece of recognition data has been found but also on whether characters matching the previous and the previous-but-one pieces of recognition data for which matches were to be found have been found.

The circles in FIG. 7 indicate that a character string that matches the recognition data was found. The crisscrosses (x marks) indicate that no character string that matches the recognition data was found. For example, if the character string detection unit 120 detects both character strings that match the previous and current pieces of recognition data, it determines that the character string that matches the current piece of recognition data was found, whether the previous-but-one piece of recognition data was found or not.

If the character, string detection unit 120 detects a character string that matches the previous piece of recognition data but not a character string that matches the current piece of recognition data, it leaves the process for the current piece of recognition data despite the detection result of the previous-but-one piece of recognition data, ends step S620, and then proceeds to the process for the next piece of recognition data.

If no character string that matches the previous piece of recognition data is found, the character string detection unit 120 performs the following process.

If the character string detection unit 120 detects both character strings that match the previous-but-one and current pieces of recognition data, it determines that the previous piece of recognition data matches a character string between the character string that matches the previous-but-one piece of recognition data and the character string that matches the current piece of recognition data.

If the character string detection unit 120 detects a character string that matches the previous-but-one piece of recognition data but not a character string that matches the current one, it leaves the process for the current piece of recognition data, ends step S620, and proceeds to the process for the next piece of recognition data. However, if the current piece of recognition data is the last piece of recognition data for which a match is to be detected, the character string detection unit 120 causes the character detection unit 130 to find a character that matches a piece of data in the concatenated data consisting of the previous and current pieces of recognition data. In other words, the character string detection unit 120 determines at step S630 that detection of matching characters is necessary.

If the character string detection unit 120 does not find a character string that matches the previous-but-one piece of recognition data but does find a character string that matches the current piece of recognition data, it causes the character detection unit 130 to find a character that matches a piece of data in the concatenated data consisting of the previous-but-one and previous pieces of recognition data. If the reliability of the recognition data based on the result of detection by the character detection unit 130 is lower than a predetermined reference value, the character string detection unit 120 sets a reevaluation flag for the recognition data, indicating that the recognition data is low-reliability data. The flag is represented by a triangle in FIG. 7.

If the character string detection unit 120 detects no character strings that match any of the previous-but-one, previous, and current pieces of recognition data, it again causes the character detection unit 130 to find a character that matches a piece of data in the concatenated data of the previous, previous-but-one, and previous-but-two piece of recognition data.

On the other hand, if the character string detection unit 120 does not find a character string that matches the previous-but-one piece of recognition data and the reevaluation flag is set for the previous piece of recognition data, it performs the following process.

If the character string detection unit 120 finds a character string that matches the current piece of recognition data, it clears the reevaluation flag of the previous piece of recognition data and determines that it has found a character string that matches the previous piece of recognition data. This means that the triangle is replaced with a circle in FIG. 7. On the other hand, if the character string detection unit 120 does not find a character string that matches the current piece of recognition data, it clears the reevaluation flag of the previous piece of recognition data and determines that it cannot find a character string matching the previous piece of recognition data. This means that the triangle is replaced with a crisscross.

In this way, for each of a plurality pieces of recognition data, not only if a character string that perfectly matches the current piece of recognition data is found but also if both character strings that match the preceding and succeeding pieces of recognition data are found, the character string detection unit 120 determines that a character string that matches the current piece of recognition data has been found. More properly, if the character string detection unit 120 detects a first character string that matches a first piece of recognition data and a second character string that matches a second character string, the character string detection unit 120 finds the character string succeeding first character string and preceding the second character string as the character string that matches the piece of data that succeeds the first piece of recognition data and precedes the second piece of recognition data. The concept of "match" subsumes such a match found based on matches of the preceding and succeeding pieces of recognition data, as well as a perfect match. Hereafter, this type of match is called an enveloping match.

This can minimize the number of operations for character- or phoneme-based detection, thereby increasing the efficiency of the process. Furthermore, if character-based detection is required, the search range can be limited and therefore the efficiency of the detection can be increased.

Figure 8:
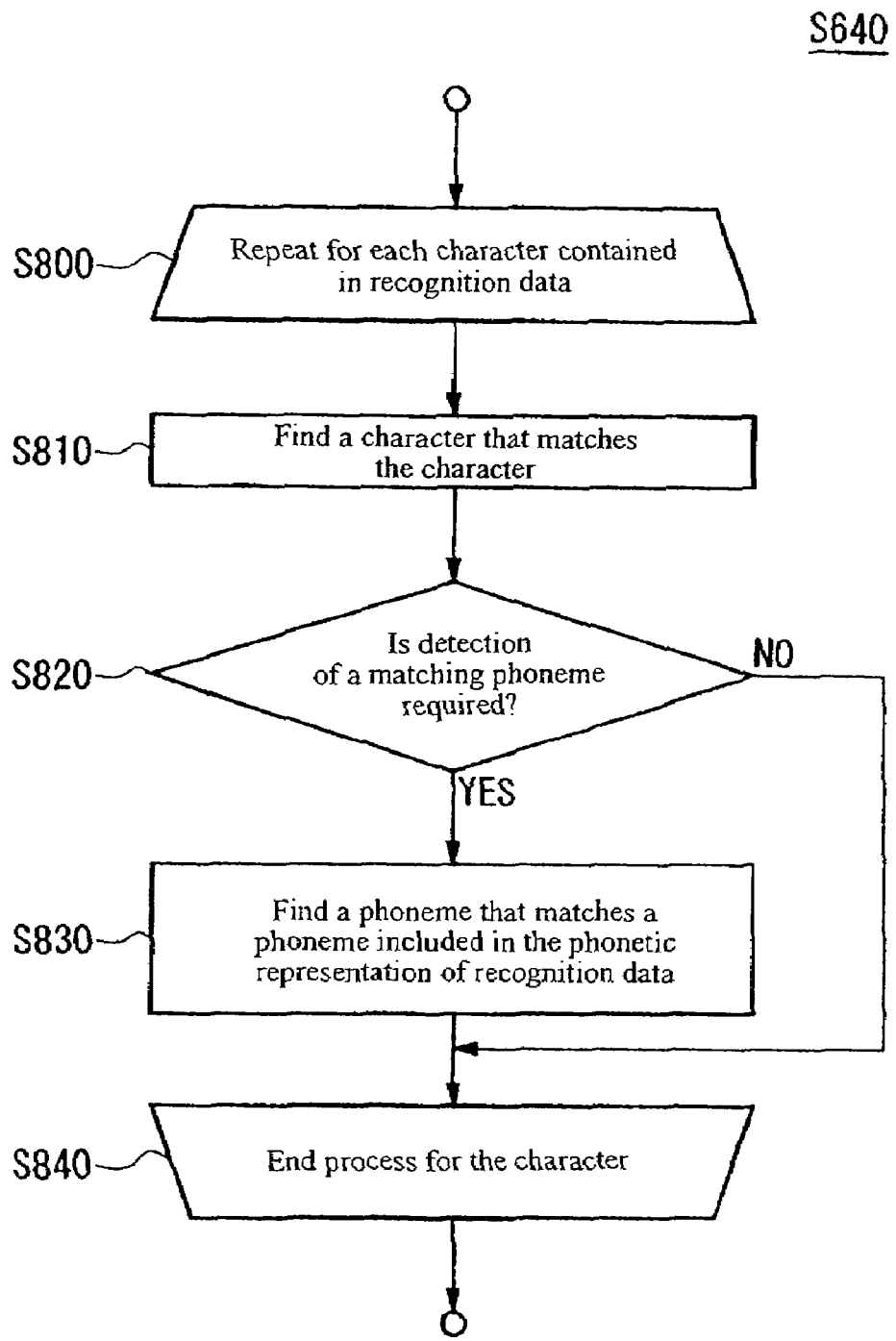
FIG. 8 shows details of operations performed at S640.

FIG. 8 shows details of an operation performed at S640. The character detection unit 130 performs the following process for each of the characters contained in recognition data (S800). The character detection unit 130 finds in the scenario data 20 a character that matches that character (S810). Then, the character detection unit 130 determines whether an operation is necessary for finding a phoneme that matches a phoneme contained in a character in a piece of recognition data for which no matching character was found (S820).

If the operation is necessary (S820: YES), then the phoneme detection unit 150 finds in the phonetic representations of the scenario data 20 a phoneme that matches a phoneme contained in the phonetic representation of each of characters for which no matching characters were found by the character detection unit 130 (S830). The character detection unit 130 repeats the above-described process for each character (S840).

FIG. 9 shows details of a first set of operations performed at S810. The character detection unit 130 performs the operations shown in FIG. 9, if the current character for which a matching character is to be found is not the last character of recognition data. The character detection unit 130 first finds in the scenario data 20 a character that matches the current character. Then, the character detection unit 130 performs the following process based not only on whether the current character has been found but also on whether characters that match the previous character for which a matching character was to be found and the first character of a piece of recognition data (or a set of pieces of recognition data) have been found.

If the character detection unit 130 detects a character that matches the previous character and also detects a character that matches the current character, it ends step S810 and proceeds to the detection process for the next character. On the other hand, if the character detection unit 130 detects a character that matches the previous character but not a character that matches the current character, it leaves the detection process for the current character and proceeds to the detection process for the next character.

If the character detection unit 130 does not find a character that matches the previous character, it performs the following process depending on other conditions.

If the character detection unit 130 finds a character that matches the first character and a character that matches the current character, it determines that the entire piece of recognition data for which matching characters are to be found matches the character strings of the scenario data 20. That is, the character detection unit 130 finds an enveloping match of a plurality of characters in the same piece of recognition data. The concept of "a match of a character" subsumes such a match based on matches for the preceding and succeeding characters as well as a perfect match.

On the other hand, if the character detection unit 130 does not find a character that matches the current character, it leaves the detection process for the current character and proceeds to the process for the next character. If the character detection unit 130 does not find a character that matches the first character but finds a character that matches the current character, it ends the step S810 and proceeds to the detection process for the next character.

FIG. 10 shows details of a second set of operations performed at S810. If the current character is the last character of recognition data, the character detection unit 130 performs operations in FIG. 10. In particular, the character detection unit 130 performs the following process based on whether it finds a match for the first character in a piece of recognition data (or a set of pieces of recognition data) for which a match is to be found and on whether a match for the next piece of recognition data was found by the character string detection unit 120.

If the character detection unit 130 finds a character that matches the first character and a character string that matches the next piece of recognition data was found, it determines that the current piece of recognition data in its entirety matches. On the other hand, if the character detection unit 130 finds a character that matches the first character but a character string that matches the next piece of recognition data was not found, it causes the phoneme detection unit 150 to find a phoneme that matches any of the phonemes in the character string that follows the first character.

If the character detection unit 130 does not find a character that matches the first character but a character string that matches the next piece of recognition data was found, it causes the phoneme detection unit 150 to find a phoneme that matches any of the phonemes in the character string preceding the next piece of recognition data. On the other hand, if the character detection unit 130 does not find a character that matches the first character and a character string that matches the next piece of recognition data was not found, it causes the phoneme detection unit 150 to find a phoneme that matches any of the phonemes in the current piece of recognition data for which a matching character is to be found.

FIG. 11 shows details of a first set of operations performed at S830. If a phoneme for which a match is to be found is not of the last character of recognition data, the phoneme detection unit 150 performs the following process. The phoneme detection unit 150 first finds in phonemes in given candidate phonetic representations in the scenario data 20 a phoneme that matches the phoneme for which a match is to be found. If the phoneme detection unit 150 does not find a matching phoneme, it compares the phoneme with the candidate phonetic representations of the next highest likelihood of being sounded out. The phoneme detection unit 150 compares the phoneme with candidate phonetic representations individually in descending order of likelihood of being sounded out. If the phoneme does not match any of the candidate phonetic representations, then the phoneme detection unit 150 leaves the process for the phoneme and proceeds to the process for the next phoneme.

Then, if the phoneme detection unit 150 finds a phoneme that matches the current phoneme, it performs the following process based on whether a match of the first character of the current piece of recognition data (or a set of pieces of recognition data) for which a match is to be detected has been found and on whether a match of the previous phoneme has been found.

If a character that matches the first character has been found, the character detection unit 130 determines that characters that match the characters in the recognition data for which no matching characters were detected are detected. In this way, enveloping matches can be detected based on a match between phonemes. On the other hand, if the phoneme detection unit 150 detects a phoneme that matches the current phoneme, it ends the process for the current phoneme and proceeds to the process for the next phoneme.

FIG. 12 shows details of a second set of operations performed at S830. If the current phoneme is of the last character in the recognition data, the phoneme detection unit 150 performs operations shown in FIG. 12. In particular, the phoneme detection unit 150 performs the following process based on whether or not a character string that matches the first character has been found, or on whether or not a character that matches the next piece of recognition data has been found, or on whether or not the current piece of recognition data is the last piece of recognition data (for example recognition data 30-N).

If no character string that matches the next piece of recognition data has been found or if the current piece of recognition data is not the last piece of recognition data, the phoneme detection unit 150 ends step S830, which is the process for detecting a matching phoneme. As a result, the character string detection unit 120 proceeds to processing for the next piece of recognition data. On the other hand, if a character string that matches the next piece of recognition data has been found or if the current piece of recognition data is the last piece of recognition data, then the following process is performed.

If a character that matches the first character has been found, then the phoneme detection unit 150 assumes that there are matches for characters in the current piece of recognition data for which matching characters have not been found. On the other hand, if a character that matches the first character has not been found, the phoneme detection unit 150 performs a forced allocation process for detecting a phoneme on the basis of the length of speech or the length of the character, without regard to the content of the speech. The reliability calculating unit 160 produces a lower reliability for a piece of recognition data for which matching phonemes have been found through forced allocation than for a piece of recognition data for which matching characters have been found without forced allocation.

Figure 13:
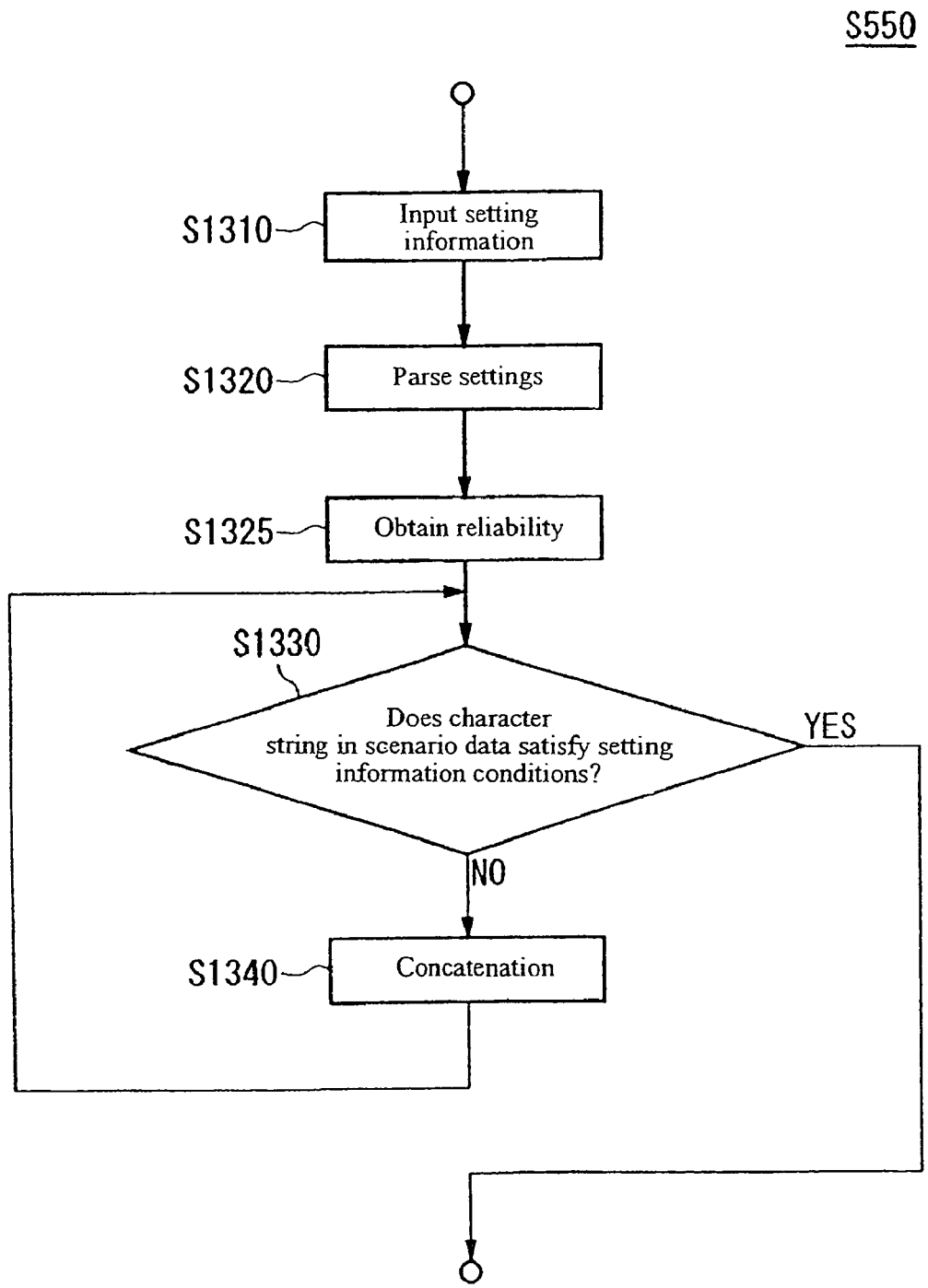
FIG. 13 shows details of operations performed at S550.

FIG. 13 shows details of an operation performed at S550. The display setting unit 170 obtains from a caption line display device 15 information about settings for captions to be displayed, which have been entered by a user (S1310). For example, the display setting unit 170 may parse a command indicating setting information to determine the setting (S1320). The setting information may be the number of characters to be displayed on one line on the display screen of the caption line display device 15 or may be an indication as to whether a new caption line should be started after a punctuation mark.

The reliability obtaining unit 165 obtains, for each character string contained in the scenario data 20, the time point at which the character string should be displayed and the reliability that the sound of the character string will be reproduced at the time from the reliability calculating unit 160 (S1325). The display setting unit 170 determines whether each character string in the scenario data 20 that matches each piece of recognition data meets the conditions of the setting information (S1330).

If the character string does not meet the conditions (S1330: NO), then the display setting unit 170 concatenates a number of character strings together (S1340). In particular, if the reliability of one of two successive character strings among the character stings that is to be displayed first is higher than that of the other character string that is to be displayed next, then the display setting unit 170 makes a setting so that the concatenated character string consisting of the character string that is to be displayed first followed by the character string to be displayed next is displayed at the time at which the character string to be displayed first should be displayed.

Then, the display setting unit 170 returns to S1330 and repeats the determination. In this way, the display setting unit 170 repeats concatenation of character strings until the setting condition is satisfied. For example, if the reliability associated with the character string to be displayed is higher than that of the character string that follows the character string to be displayed succeeding the first character string, immediately before performing step S1340, the display setting unit 170 may make a setting so that the concatenated character string consisting of the character string concatenated at S1340 followed by the succeeding character string is displayed at the time at which the first character string should be displayed.

In this way, the display setting unit 170 can concatenate character strings according to the capabilities and features of a display device to provide an optimum usability to a user.

As described with reference to FIGS. 1 to 13, when setting the display timing of textual data resulting from speech recognition, the caption setting device 10 divides the textual data into pieces of recognition data consisting of one to three words through recognition line splitting and determines whether each piece of recognition data matches a character string in the scenario data 20. On the other hand, when a caption line is displayed, the caption setting device 10 concatenates the pieces of recognition data appropriately according to the properties of the display screen. That is, data addressed when setting display timing is different in length from data addressed when generating captions. This allows both processes to be performed efficiently. Because the caption setting device 10 uses the result of speech recognition to set display timing, the accuracy of display timing will be able to be increased with advances in speech recognition technology.

Results of an experiment conducted with the caption setting device 10 of the present embodiment will be described below. In the experiment, the caption setting device 10 used ad-lib speech of 32 lines and predetermined speech of 86 lines in a script as its inputs. DP matching of all lines resulted in timestamp errors in 12% of the sentences. The character string detection unit 120 detected character strings of 66 lines and the character detection unit 130 detected characters of 36 lines. This provided no timestamp errors. The phoneme detection unit 150 detected phonemes of characters of 6 lines. As a result, timestamp error occurred in 2% of characters. Furthermore, the phoneme detection unit 150 performed forced allocation and as a result produced timestamp errors in 4% of characters. Thus, compared with DP matching, which has been known as a highly efficient algorithm, the present method can set display timing with high accuracy.

In the experiment, the display setting unit 170 caused two of the character strings containing characters detected by the character detection unit 130 to be concatenated with another character string and displayed and caused three of the character strings containing characters detected by the phoneme detection unit 150 to be concatenated with another character string. It also caused ten of the character strings containing characters detected by using forced allocation to be concatenated with another character string. In this way, by producing lower reliabilities as the level of up-scaling is raised, character strings having timestamps that are more likely to be erroneous are concatenated with other character strings and the concatenated strings are displayed. As a result, the accuracy of the display timing of caption lines can be increased.

Figure 14:
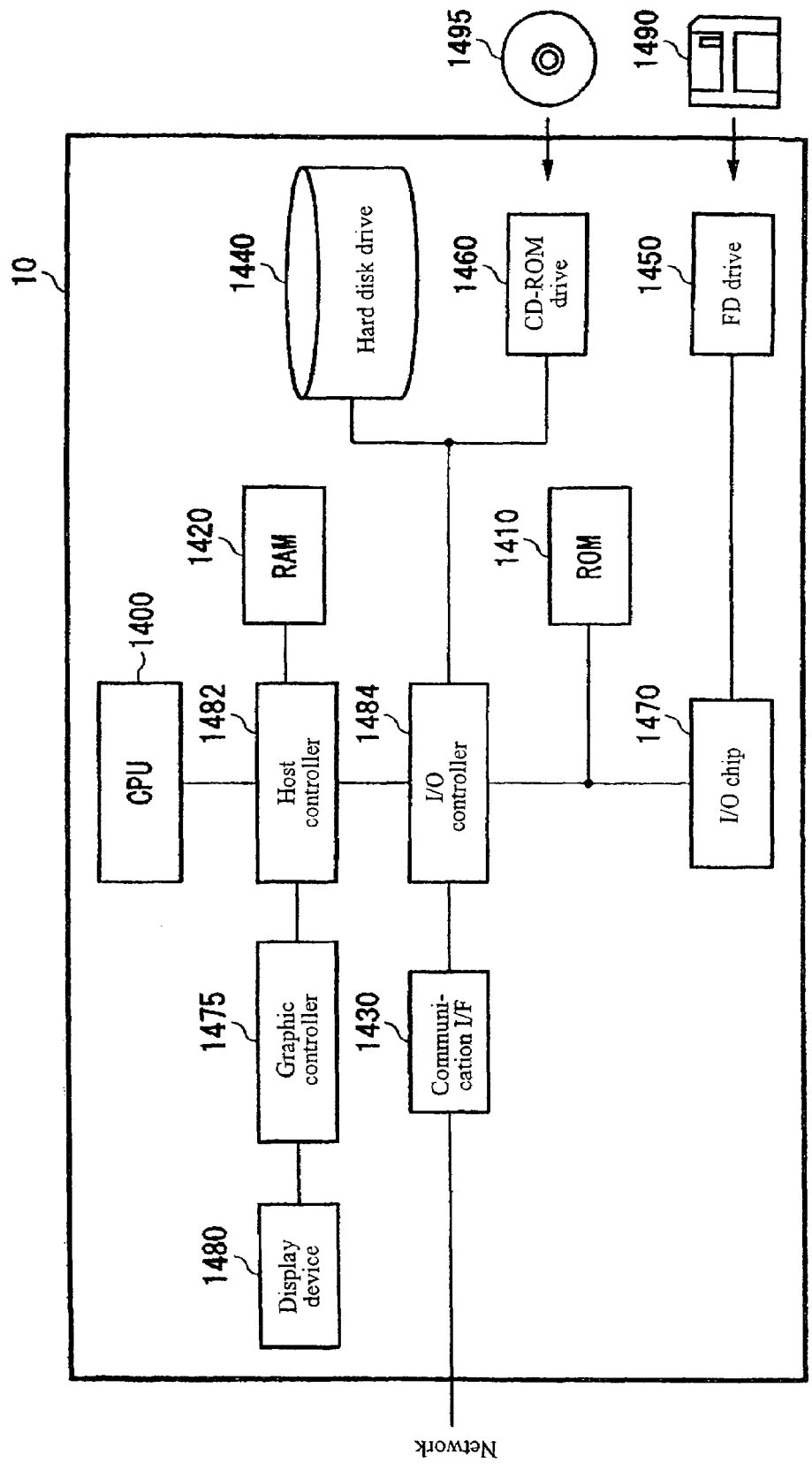
FIG. 14 shows an exemplary hardware configuration of a computer functioning as the caption setting device 10.

FIG. 14 shows an exemplary hardware configuration of a computer functioning as the caption setting device 10. The caption setting device 10 includes a CPU section including a CPU 1400, a RAM 1420, a graphic controller 1475, and a display device 1480 interconnected through a host controller 1482, an input/output section including a communication interface 1430, a hard disk drive 1440, and a CD-ROM drive 1460 which are connected to the host controller 1482 through an input/output controller 1484, and a legacy input/output section including a ROM 1410, a flexible disk drive 1450, and an input/output chip 1470 which are connected to the input/output controller 1484.

The host controller 1482 connects the RAM 1420 with the CPU 1400 and the graphic controller 1475 which access the RAM 1420 at higher transfer rates. The CPU 1400 operates according to programs stored in the ROM 1410 and the RAM 1420 to control each component. The graphic controller 1475 obtains image data generated by the CPU 1400 on a frame buffer provided in the RAM 1420 and displays it on the display device 1480. Alternatively, the graphic controller 1475 may contain a frame buffer for storing image data generated by the CPU 1400.

The input/output controller 1484 connects the host controller 1482 with the communication interface 1430, the hard disk drive 1440, and CD-ROM drive 1460, which are relatively fast input/output devices. The communication interface 1430 communicates with external devices through a network. The hard disk drive 1440 stores programs and data used by the caption setting device 10. The CD-ROM drive 1460 reads a program or data from the CD-ROM 1495 and provides it to the input/output chip 1470 through the RAM 1420.

Connected to the input/output controller 1484 are the ROM 1410 and relatively slow input/output devices such as the flexible disk drive 1450 and the input/output chip 1470. The ROM 1410 stores a boot program executed by the CPU 1400 during boot-up of the caption setting device 10 and programs which are dependent on the hardware of the caption setting device 10. The flexible disk drive 1450 reads a program or data from a flexible disk 1490 and provides it to the input/output chip 1470 through the RAM 1420. Connected to the input/output chip 1470 are a flexible disk 1490 and input/output devices through ports such as a parallel port, serial port, keyboard port, and mouse port, for example.

A program to be provided to the caption setting device 10 is stored on recording medium such as a flexible disk 1490, a CD-ROM 1495, or an IC card and provided by a user to the caption setting device 10. The program is read from the recording medium through the input/output chip 1470 and/or the input/output controller 1484 and installed and executed in the caption setting device 10.

The program installed and executed in the caption setting device 10 includes a scenario data obtaining module, a speech recognition module, a character string detecting module, a character detecting module, a phoneticizing module, a phoneme detecting module, a reliability calculating module, a reliability obtaining module, and display setting module. These modules cause the caption setting device 10 to perform operations which are the same as those performed by their corresponding components of the caption setting device 10 described with reference to FIGS. 1 to 13 and therefore the description of which will be omitted.

The programs and modules mentioned above may be stored in an external storage medium. Such a storage medium may be a flexible disk 1490 or a CD-ROM 1495, or an optical recording medium such as a DVD and PD, a magneto-optical recording medium such as an MD, a tape medium, or a semiconductor memory such as an IC card. Alternatively, a storage such as a hard disk or a RAM provided in a server system connected to a private communication network or the Internet may be used as a recording medium and the program may be provided from the storage to the caption setting device 10 over the network.

Figure 15:
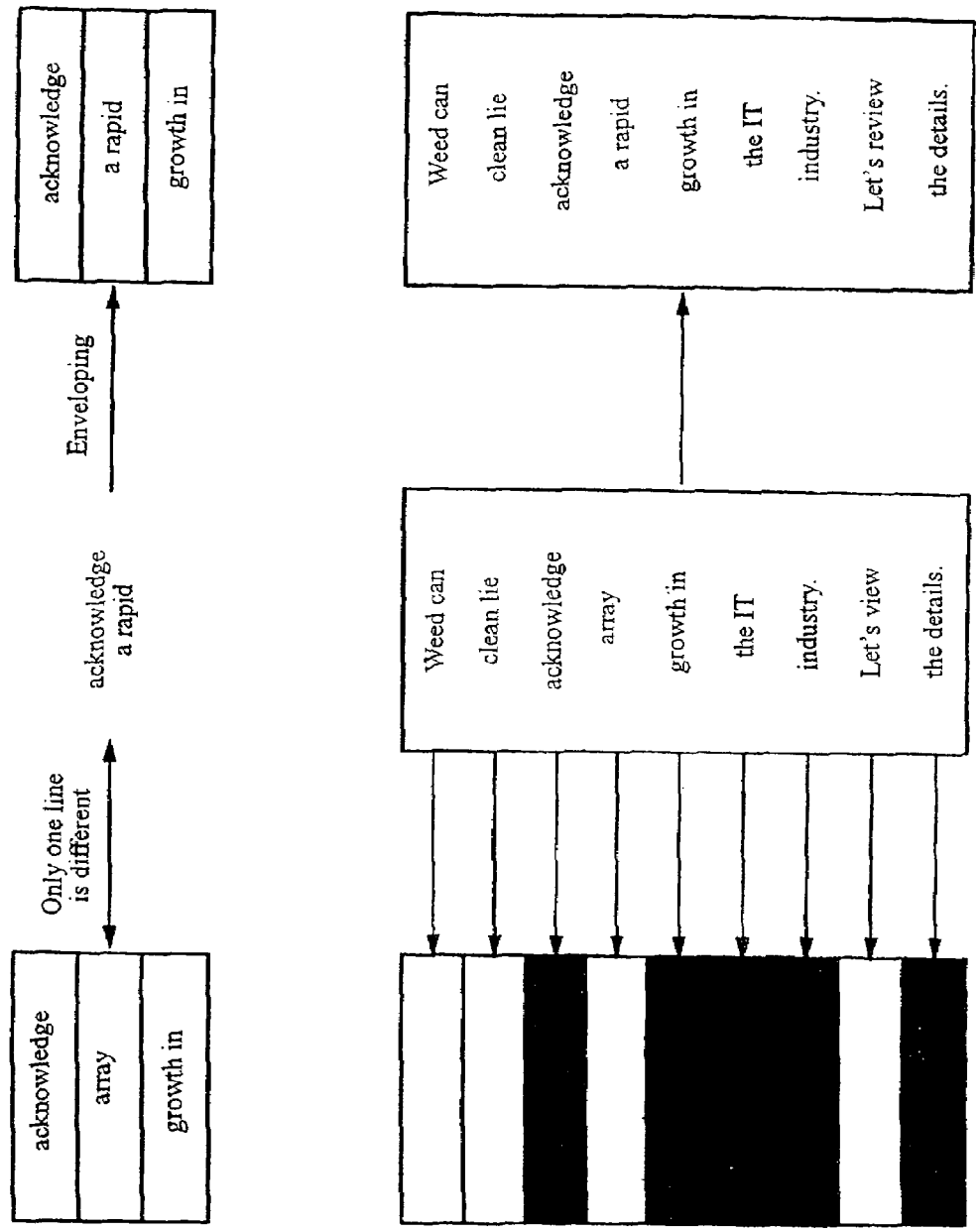
FIG. 15 is a diagram illustrating an exemplary process performed by a character string detection unit 120.

FIG. 15 is a diagram illustrating an exemplary process performed by the character string detection unit 120. The character string detection unit 120 detects a character string that matches a first piece of recognition data, "acknowledge" and a third piece of recognition data, "growth in" in scenario data 20. The character string detection unit 120 cannot detect a character string that completely matches the piece of recognition data "array", which lies between the first and third pieces of recognition data. In this situation, the character string detection unit 120 can use enveloping matching to detect a character string "a rapid" between character strings "acknowledge" and "growth in" in the scenario data 20 as the character string that matches the character string "array." Similarly, the character string detection unit 120 can detect a character string, "Let's review" as a character string that matches a character string "Let's view."

Figure 16:
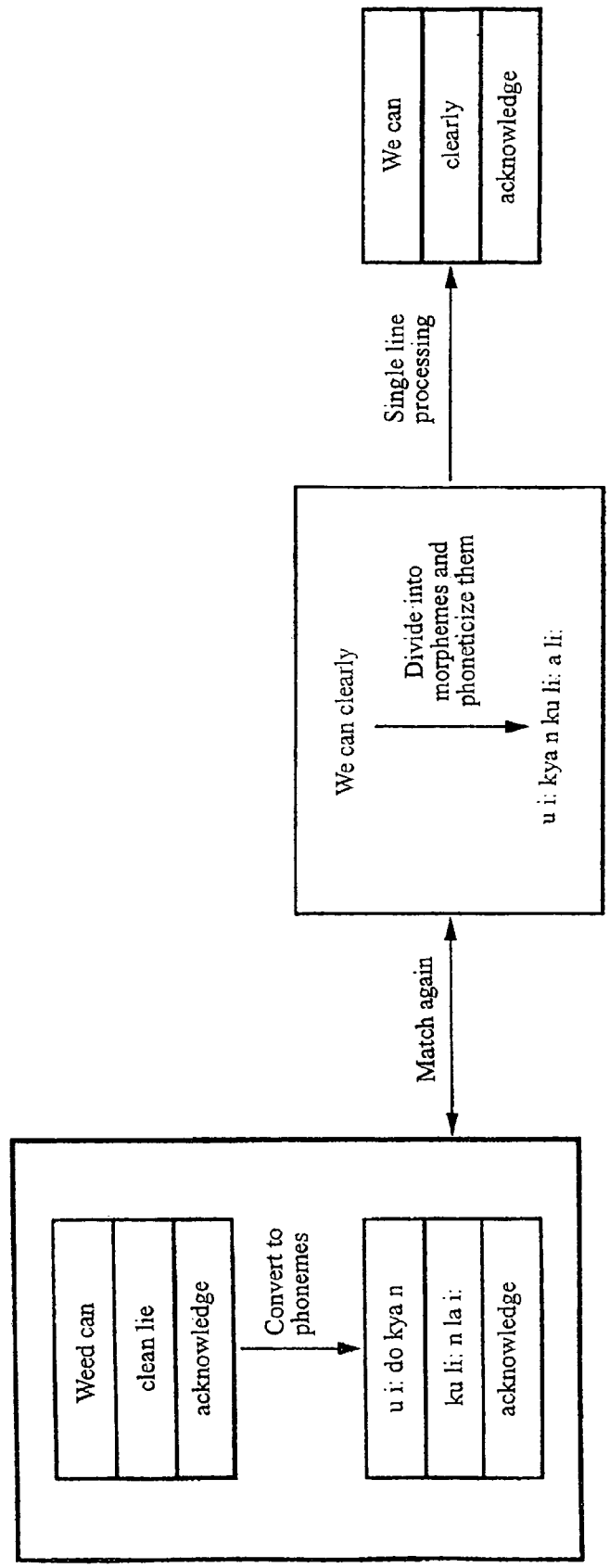
FIG. 16 shows an example of a first process performed by a phoneme detection unit 150.

FIG. 16 shows an example of a first process performed by the phoneme detection unit 150. The phoneme detection unit 150 converts each character for which no matching character has been found by the character detection unit 130 into phonemes. For example, the phoneme detection unit 150 converts character strings "Weed can" and "clean lie" into sets of phonemes "u i: do kya n" and "ku li: n la i:", respectively.

The phoneticizing unit 140 generates "u i: kya n ku li: a li:" as a candidate phonetic representation of scenario data "We can clearly". Consequently, the character string detection unit 120 can find in the scenario data the character string "clearly", which includes phonemes that match phonemes in "clean lie" as a character string that matches the recognition data "clean lie." Based on this detection, the character string detection unit 120 may further find the character string "We can" as a character string that matches the recognition data "Weed can."

Figure 17:
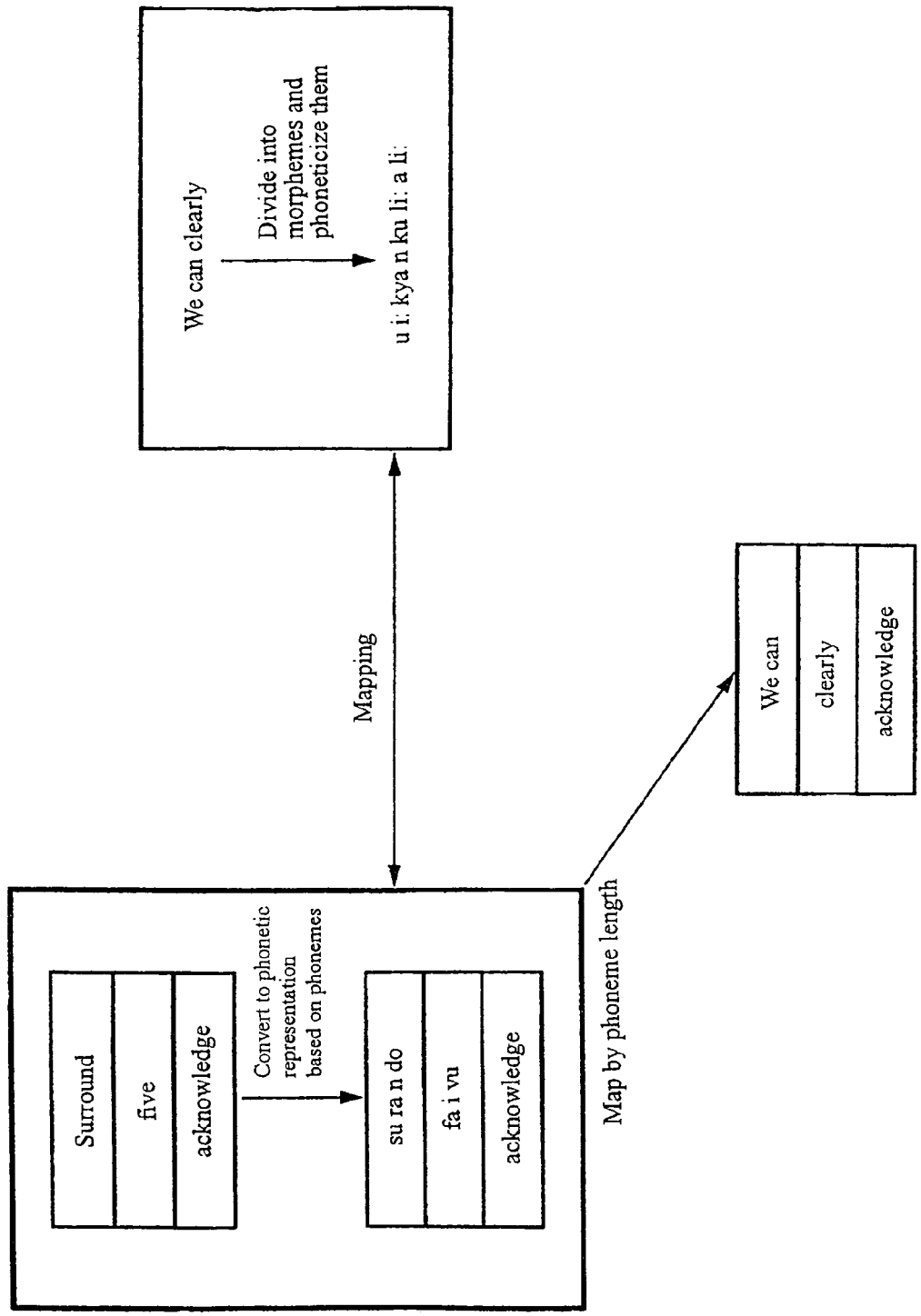
FIG. 17 shows an example of a second process performed by the phoneme detection unit 150.

FIG. 17 shows an example of a second process performed by the phoneme detection unit 150. The phoneme detection unit 150 converts each character for which no matching character has been found by the character detection unit 130 into phonemes included in the phonetic representation of the character. For example, the phoneme detection unit 150 converts characters "Surround" and "five" into phonemes "su ra n do" and "fa i vu". It should be noted that the accuracy of speech recognition in the example shown in FIG. 17 is lower than that of the example shown in FIG. 16.

As in the example in FIG. 16, the phoneticizing unit 140 generates phonemes "u i: kya n ku li: a li:" as a candidate phonetic representation of the character string "We can clearly". However, the phoneme detection unit 150 cannot detect in "u i: kya n ku li: a li:" a character or character string for which a matched phoneme is found in "su ra n do:" and "fa i vu."

In this situation, the phoneme detection unit 150 performs forced allocation for detecting matching phonemes based on the length of speech or the length of a character without regard to the content of the speech. For example, it may determine based on the ratio of the amount of reproduction time of speech recognized as "su ra n do" to the amount of reproduction time of speech recognized as "fa i vu" that the phonemes "su ra n do" match the phonemes "u i: kya n" or that the phonemes "fa i vu" match the phonemes "ku li: a li:".

Figure 18:
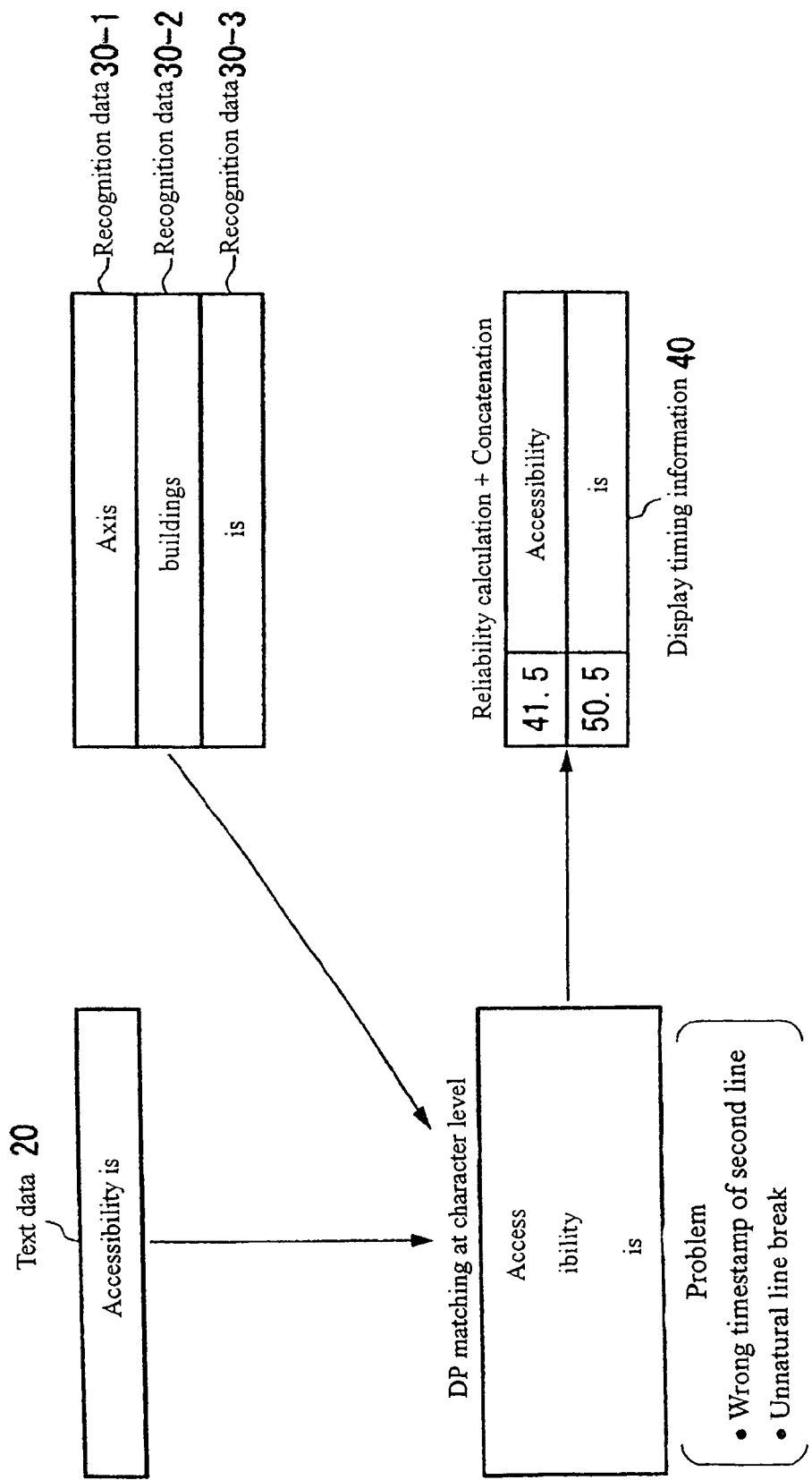
FIG. 18 is a diagram summarizing the outline of a process according to the present embodiment.

FIG. 18 outlines a process according to the present embodiment. The scenario data obtaining unit 100 obtains scenario data 20, which is character strings "Accessibility is", for example. The speech recognition unit 110 generates pieces of recognition data 30-1 to 30-3, "Axis", "buildings", and "is", for example, through speech recognition. The character string detection unit 120 first compares the character strings "Accessibility is" and "Axis buildings is" with the scenario data 20 by using DP matching to detect characters that match characters contained in the pieces of recognition data 30-1 to 30-3.

As a result, the character string detection unit 120 finds a character string "Access" as a character string that matches the piece of recognition data 30-1 and a character string "ibility" as a character string that matches the piece of recognition data 30-2. If a caption were generated based on this result, two problems would arise. The first problem is that although "bility" should be displayed at the time when speech is recognized as "buildings", the character string "ibility" would be displayed. In other words, the timestamp indicating the time point at which the character string "ibility" should be displayed is wrong.

A second problem is that the single word "Accessibility" is detected as the two character strings "Access" and "ibility" because the word "accessibility" is not contained in a dictionary for speech recognition. Consequently, a caption line break can be inserted between "Access" and "ibility."

The character string detection unit 120 finds another character string in the scenario data 20 that matches each piece of recognition data 30-1 to 30-3. The reliability calculating unit 160 calculates the reliability representing the likelihood that a character string that matches each piece of recognition data 30-1 to 30-3 will be found in the scenario data 20. The reliability calculating unit 160 produces a higher reliability for the piece of recognition data 30-3 "is" than the piece of recognition data 30-2 "ibility".

The display setting unit 170 obtains setting information indicating that the number of characters displayable on one caption line is 13. Then the display setting unit 170 concatenates the "Access" with "ibility" to generate the word "Accessibility" rather than concatenating the word "ibility" with the word "is". Consequently, the display setting unit 170 can generate display timing information 40 that indicates the words "Accessibility" and "is" should be displayed at predetermined time points, "41.5" and "50.5", respectively.

While the present invention has been described with respect to a specific embodiment, the technical scope of the present invention is not limited to the embodiment described above. It will be apparent to those skilled in the art that various modifications and improvements can be made to the embodiment. It will be apparent from the claims that embodiments to which such modifications and improvements are made also fall in the scope of the technical scope of the present invention.

According to the embodiments described above, the following setting apparatus, program, recording medium, and method are provided.

(1) A setting apparatus for setting the timing of displaying text of speech in synchronization with reproduction of the speech, the text of the speech being predetermined, the setting apparatus comprising: a scenario data obtaining unit for obtaining scenario data representing the content of the speech; a speech recognition unit for dividing textual data resulting from recognition of the speech being reproduced to generate a plurality of pieces of recognition data; a character string detection unit for detecting in the scenario data a character string that matches each of the plurality of pieces of recognition data; a character detection unit for detecting a character string that matches the recognition data from the scenario data by detecting the character contained in the recognition data for each recognition data with which the character string detection unit has detected no matching characters string; and a display setting unit for setting the display timing of displaying each of character strings contained in the scenario data to the timing at which speech recognized as the piece of recognition data that matches the character string is reproduced.

(2) The setting apparatus according to item (1), further comprising a phoneme detection unit for detecting in a phonetic representation of the scenario data a phoneme that matches a phoneme contained in a character in the recognition data for which no matching character has been detected by the character detection unit, wherein the character detection unit detects in the scenario data, as a character that matches a character for which a matching phoneme has been found in the recognition data by the phoneme detection unit, a character containing the phoneme.

(3) The setting apparatus according to item (2), further comprising a phoneticizing unit for generating a plurality of candidate phonetic representations of the scenario data, wherein the phoneme detection unit detects, in any of the plurality of candidate phonetic representations generated by the phoneticizing unit, a phoneme that matches a phoneme contained in a phonetic representation of a character in the recognition data for which no matching character is found in the scenario data by the character detection unit.

(4) The setting apparatus according to item (3), wherein: the phoneticizing unit generates each of the plurality of candidate phonetic representations in the scenario data along with information indicating the likelihood that the scenario data is sounded out in accordance with the candidate phonetic representation; and the phoneme detection unit compares a phoneme contained in a phonetic representation of a character contained in the recognition data with the plurality of candidate phonetic representations in descending order of likelihood of being sounded out.

(5) The setting apparatus according to item (1), further comprising a reliability calculating unit for calculating reliability which represents the likelihood that each of the plurality of pieces of recognition data matches a character string, wherein: the character string detection unit determines that the character string detection unit cannot detect a character string that matches a low-reliability data which is a piece of recognition data having a reliability lower than a predetermined reference reliability if the character string detection unit cannot detect a character string that matches the character string following the low-reliability data.

(6) The setting apparatus according to item (1), further comprising a reliability calculating unit for calculating reliability which represents the likelihood that each of the plurality of pieces of recognition data matches a character string, wherein: the display setting unit makes a setting that, if the reliability associated with a character string to be displayed first in two successive character strings among the plurality of character strings in the scenario data is higher than the reliability associated with the next character string to be displayed in the two successive character strings, causes the concatenated character string consisting of the character string to be displayed first and the next character string appended to the first character string to be displayed at a time point at which the first character string should be displayed.

(7) The setting apparatus according to item (6), wherein the reliability calculating unit produces a higher reliability for a piece of recognition data for which a matching character string has been detected by the character string detection unit than the reliability of a piece of recognition data for which a matching character string has been detected by the character detection unit.

(8) The setting apparatus according to item (6), further comprising a phoneme detection unit for detecting in a phonetic representation of the scenario data a phoneme that matches a phoneme contained in a character in the recognition data for which no matching character has been detected by the character detection unit, wherein the character detection unit detects in the scenario data, as a character that matches a character in the recognition data for which a matching phoneme has been detected by the phoneme detection unit, a character containing the phoneme; and the reliability calculating unit produces a lower reliability for a piece of recognition data containing a character for which a matching phoneme has been detected by the phoneme detection unit than the reliability of a piece of recognition data containing a character for which no matching phoneme has been detected by the phoneme detection unit but for which a matching character has been detected by the character detection unit.

(9) The setting apparatus according to item (1), wherein the speech recognition unit further generates a speech recognition certainty factor indicating the possibility that each of the plurality of pieces of recognition data resulting from speech recognition matches the content of speech being reproduced; and the character string detection unit finds a character string that matches a piece of recognition data having a higher speech recognition certainty factor prior to finding a piece of recognition data having a lower speech recognition certainty factor and, if the character string detection unit detects a first character string that matches a first piece of the recognition data and a second character string that matches a second piece of the recognition data, detects a character string following the first character string and preceding the second character string as a character string that matches the piece of recognition data following the first piece of recognition data and preceding the second piece of recognition data.

(10) The setting apparatus according to item (1), wherein the display setting unit makes a setting that causes a piece of recognition data for which no matching character string has been detected in the scenario data by the character string detection unit to be displayed during reproduction of speech recognized as the piece of recognition data through speech reproduction.

(11) A setting apparatus for setting the timing of displaying text of speech in synchronization with reproduction of the speech, the text of the speech being predetermined, the setting apparatus comprising: a reliability obtaining unit for obtaining, in connection with each of a plurality of character strings contained in scenario data representing the content of the speech being reproduced, a time point at which the character string should be displayed and reliability indicating the likelihood that speech representing the character string is reproduced at the time point; and a display setting unit for making a setting that, if the reliability associated with a character string to be displayed first in two successive character strings among the plurality of character strings is higher than the reliability associated with the next character string to be displayed in the two successive character strings, causes a concatenated character string consisting of the character string to be displayed first and the next character string appended to the first character string to be displayed at a time point at which the first character should be displayed.

(12) The setting apparatus according to item (11), wherein the display setting unit makes a setting that, if the reliability associated with the character string to be displayed first is higher than the reliability associated with the succeeding character string that follows the character string to be displayed subsequently, causes a concatenated character string consisting of the concatenated character string and the succeeding character string appended to the concatenated character string to be displayed at a time point at which the character string to be displayed first should be displayed.

(13) A program that causes a computer to function as a setting apparatus for setting the timing of displaying text of speech in synchronization with reproduction of the speech, the text of the speech being predetermined, the program causing the computer to function as: a scenario data obtaining unit for obtaining scenario data representing the content of the speech; a speech recognition unit for dividing textual data resulting from recognition of the speech being reproduced to generate a plurality of pieces of recognition data; a character string detection unit for detecting in the scenario data a character string that matches each of the plurality of pieces of recognition data; a character detection unit for detecting a character string that matches the recognition data from the scenario data by detecting the character contained in the recognition data for each recognition data with which the character string detection unit has detected no matching characters string; and a display setting unit for setting the display timing of displaying each of character strings contained in the scenario data to the timing at which speech recognized as the piece of recognition data that matches the character string is reproduced.

(14) A program that causes a computer to function as a setting apparatus for setting the timing of displaying text of speech in synchronization with reproduction of the speech, the text of the speech being predetermined, the program causing the computer to function as: a reliability obtaining unit for obtaining in combination with each of a plurality of character strings contained in scenario data representing the content of the speech being reproduced, a time point at which the character string should be displayed and reliability indicating the likelihood that speech representing the character string is reproduced at the time point; and a display setting unit for making a setting that, if the reliability associated with a character string to be displayed first in two successive character strings among the plurality of character strings is higher than the reliability associated with the next character string to be displayed in the two successive character strings, causes a concatenated character string consisting of the character string to be displayed first and the next character string appended to the first character string to be displayed at a time point at which the first character string should be displayed.

(15) A recording medium on which the program according to item (13) or (14) is recorded.

(16) A method for setting the timing of displaying text of speech in synchronization with reproduction of the text of speech, the text of the speech being predetermined, the method using a computer to perform; a scenario data obtaining step of obtaining scenario data representing the content of the speech; a speech recognition step of dividing textual data resulting from recognition of the speech being reproduced to generate a plurality of pieces of recognition data; a character string detecting step of detecting in the scenario data a character string that matches each of the plurality of pieces of recognition data; a character detection step for detecting a character string that matches the recognition data from the scenario data by detecting the character contained in the recognition data for each recognition data with which the character string detection step has detected no matching characters string; and a display setting step of setting the display timing of displaying each of character strings contained in the scenario data to the timing at which speech recognized as the piece of recognition data that matches the character string is reproduced.

(17) A method for setting the timing of displaying text of speech in synchronization with reproduction of the text of speech, the text of the speech being predetermined, the method using a computer to perform: a reliability obtaining step of obtaining in connection with each of a plurality of character strings contained in scenario data representing the content of the speech being reproduced, a time point at which the character string should be displayed and reliability indicating the likelihood that speech representing the character string is reproduced as the time point; and a display setting step of making a setting that, if the reliability associated with a character string to be displayed first in two successive character strings among the plurality of character strings is higher than the reliability associated with the next character string to be displayed in the two successive character strings, causes a concatenated character string consisting of the character string to be displayed first and the next character string appended to the first character string to be displayed at a time point at which the first character string should be displayed.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A setting apparatus comprising
a caption setting unit for setting a timing of displaying text of speech in synchronization with reproduction of said speech, the text of said speech being predetermined, said caption setting unit comprising:
   a scenario data obtaining unit for obtaining scenario data representing content of said speech;
   a speech recognition unit for dividing textual data resulting from recognition of said speech being reproduced to generate a plurality of pieces of recognition data;
   a character string detection unit for detecting in said scenario data a character string that matches each of said plurality of pieces of recognition data;
   a character detection unit for detecting a character string that matches the recognition data from said scenario data by detecting a character contained in the recognition data for each recognition data with which said character string detection unit has detected no matching characters string;
   a display setting unit for setting the display timing of displaying each of the character strings contained in said scenario data to the timing at which speech recognized as a piece of recognition data that matches said character string is reproduce; and
   a reliability calculating unit for calculating a reliability factor that represents a likelihood that each of the plurality of pieces of recognition data matches one character string,
   wherein said display setting unit generates a setting that, if the calculated reliability factor associated with a first character string to be displayed in two successive character strings among the plurality of character strings in the scenario data is higher than the calculated reliability factor associated with a second character string to be displayed in the two successive character strings, causes a concatenated character string comprising said first character string with said second character string appended to said first character string to be displayed at a time point at which said first character string should be displayed.

2. The setting apparatus according to claim 1, further comprising
a phoneme detection unit for detecting in a phonetic representation of said scenario data a phoneme that matches a phoneme contained in each character in said recognition data for which no matching character has been detected by said character detection unit,
wherein said character detection unit detects in said scenario data, as a character that matches a character for which a matching phoneme has been found in said recognition data by said phoneme detection unit, a character containing said phoneme.

3. The setting apparatus according to claim 2, further comprising
a phoneticizing unit for generating a plurality of candidate phonetic representations of said scenario data,
wherein said phoneme detection unit detects, in any of said plurality of candidate phonetic representations generated by said phoneticizing unit, a phoneme that matches the phoneme contained in a phonetic representation of a character in said recognition data for which no matching character is found in said scenario data by said character detection unit.

4. The setting apparatus according to claim 3, wherein:
said phoneticizing unit generates each of said plurality of candidate phonetic representations in said scenario data along with information indicating the likelihood that represents a degree of accuracy to which said scenario data matches the candidate phonetic representation; and
said phoneme detection unit compares a phoneme contained in a phonetic representation of a character contained in said recognition data with said plurality of candidate phonetic representations in descending order of likelihood of matching said plurality of candidate phonetic representation.

5. The setting apparatus according to claim 1, further comprising a reliability calculating unit for calculating reliability which represents the likelihood that each of said plurality of pieces of recognition data matches one character string, wherein:
said character string detection unit determines that said character string detection unit cannot detect any character string that matches a piece of recognition data having a reliability lower than a predetermined reference reliability if said character string detection unit cannot detect the character string that matches the character string following said low-reliability data.

6. A computer program product comprising a computer usable medium having computer readable program code instructions embodied therein for causing function of setting apparatus, the computer readable program code means in said computer program product comprising computer readable program code instructions for causing a computer to effect the functions of claim 1.

7. The setting apparatus according to claim 1, wherein said reliability calculating unit produces a higher reliability for the piece of recognition data for which a matching character string has been detected by said character string detection unit than the reliability of the piece of recognition data for which a matching character string has been detected by said character detection unit.

8. The setting apparatus according to claim 1, further comprising a phoneme detection unit for detecting in a phonetic representation of said scenario data a phoneme that matches a phoneme contained in a character in said recognition data for which no matching character has been detected by said character detection unit,
wherein said character detection unit detects in said scenario data, as a character that matches a character in said recognition data for which a matching phoneme has been detected by said phoneme detection unit, a character containing said phoneme; and
said reliability calculating unit produces a lower reliability for a piece of recognition data containing a character for which a matching phoneme has been detected by said phoneme detection unit than the reliability of a piece of recognition data containing a character for which no matching phoneme has been detected by said phoneme detection unit but for which a matching character has been detected by said character detection unit.

9. The setting apparatus according to claim 1, wherein said speech recognition unit further generates a speech recognition certainty factor indicating a possibility that each of the plurality of pieces of recognition data resulting from speech recognition matches the content of speech being reproduced; and wherein the character string detection unit further performs in descending order of speech recognition certainty factor:
- finding in the scenario data a character string that matches a piece of recognition data; and,
- finding a character contained in the piece of recognition data after determining that it is necessary to detect a character that matches a piece of recognition data for which no matching character string was found;

wherein the reliability calculating unit further calculates the reliability of each piece of recognition data, which is the likelihood that the piece of recognition data will match a character string.

10. The setting apparatus according to claim 9, wherein said display setting unit makes a setting that causes the piece of recognition data for which no matching character string has been detected in said scenario data by said character string detection unit to be displayed as said piece of recognition data through speech reproduction.

11. A setting apparatus for setting the timing of displaying text of speech in synchronization with reproduction of said speech, the text of said speech being predetermined, said setting apparatus comprising:
- a reliability obtaining unit for obtaining, in connection with each of a plurality of character strings contained in scenario data representing the content of said speech being reproduced, a time point at which said character string should be displayed and a reliability factor indicating a likelihood that speech representing said character string is reproduced at said time point; and
- a display setting unit for making a setting that, if the reliability factor associated with a first character string to be displayed in two successive character strings among said plurality of character strings is higher than the reliability factor associated with a second character string to be displayed in said two successive character strings, causes a concatenated character string comprising said first character string with the second character string appended to said first character string to be displayed at a time point at which said first character string should be displayed.

12. A method for setting the timing of displaying text of speech in synchronization with reproduction of said text of speech, the text of said speech being predetermined, said method using a computer to perform;
- a scenario data obtaining step of obtaining scenario data representing the content of said speech;
- a speech recognition step of dividing textual data resulting from recognition of said speech being reproduced to generate a plurality of pieces of recognition data;
- a character string detecting step of detecting in said scenario data a character string that matches each of said plurality of pieces of recognition data;
- a character detection step for detecting a character string that matches the recognition data from said scenario data by detecting the character contained in the recognition data for each recognition data with which said character string detection step has detected no matching characters string;
- a display setting step of setting the display timing of displaying each of character strings contained in said scenario data to the timing at which speech recognized as the piece of recognition data that matches said character string is reproduced; and
- calculating a reliability factor that represents a likelihood that each of the plurality of pieces of recognition data matches one character string, wherein said display setting unit generates a setting that, if the calculated reliability factor associated with a first character string to be displayed in two successive character strings among the plurality of character strings in the scenario data is higher than the calculated reliability factor associated with a second character string to be displayed in the two successive character strings, causes a concatenated character string comprising said first character string with said second character string appended to said first character string to be displayed at a time point at which said first character string should be displayed.

13. A computer program product comprising a computer readable storage medium comprising instructions that cause a computer to function as a setting apparatus for setting the timing of displaying text of speech in synchronization with reproduction of said speech, the text of said speech being predetermined, said instructions causing said computer to function as:
- a scenario data obtaining unit for obtaining scenario data representing the content of said speech;
- a speech recognition unit for dividing textual data resulting from recognition of said speech being reproduced to generate a plurality of pieces of recognition data;
- a character string detection unit for detecting in said scenario data a character string that matches each of said plurality of pieces of recognition data;
- a character detection unit for detecting a character string that matches the recognition data from said scenario data by detecting the character contained in the recognition data for each recognition data with which said character string detection unit has detected no matching characters string;
- a display setting unit for setting the display timing of displaying each of character strings contained in said scenario data to the timing at which speech recognized as the piece of recognition data that matches said character string is reproduce; and
- a reliability calculating unit for calculating a reliability factor that represents a likelihood that each of the plurality of pieces of recognition data matches one character string;

wherein said display setting unit generates a setting that, if the calculated reliability factor associated with a first character string to be displayed in two successive character strings among the plurality of character strings in the scenario data is higher than the calculated reliability factor associated with a second character string to be displayed in the two successive character strings, causes a concatenated character string comprising said first character string with said second character string appended to said first character string to be displayed at a time point at which said first character string should be displayed.

14. A computer program product comprising a computer readable storage medium comprising instructions that cause a computer to function as a setting apparatus for setting the timing of displaying text of speech in synchronization with reproduction of said speech, the text of said speech being predetermined, said instructions causing said computer to function as:
- a reliability obtaining unit for obtaining in combination with each of a plurality of character strings contained in scenario data representing the content of said speech being reproduced, a time point at which said character string should be displayed and a reliability factor indicating the likelihood that speech representing said character string is reproduced at said time point; and a display setting unit for making a setting that, if the reliability factor associated with a first character string to be displayed in two successive character strings among said plurality of character strings is higher than the reliability factor associated with a second character string to be displayed in said two successive character strings, causes a concatenated character string comprising said first character string with said second character string appended to said first character string to be displayed at a time point at which said first character string should be displayed.

15. A method comprising setting timing of displaying text of speech in synchronization with reproduction of said text of speech, the text of said speech being predetermined, said method using a computer to perform:

a reliability obtaining step of obtaining in connection with each of a plurality of character strings contained in scenario data representing the content of said speech being reproduced, a time point at which said character string should be displayed and a reliability factor indicating the likelihood that speech representing said character string is reproduced at said time point; and a display setting step of making a setting that, if the reliability factor associated with a first character string to be displayed in two successive character strings among said plurality of character strings in the scenario data is higher than the reliability factor associated with a second character string to be displayed in said two successive character strings, causes a concatenated character string comprising said first character string with the second character string appended to said first character string to be displayed at a time point at which said first character string should be displayed.

16. An article of manufacture comprising a computer usable medium having computer readable program code instructions embodied therein for causing setting of the timing of displaying text of speech in synchronization with reproduction of said text of speech, the computer readable program code instructions in said article of manufacture comprising computer readable program code instructions for causing a computer to effect the steps of claim 15.

17. A program storage device readable by machine, tangibly embodying a program of instructions executable by the machine to perform method steps for setting the timing of displaying text of speech in synchronization with reproduction of said text of speech, said method steps comprising the steps of claim 15.

* * * * *

UNITED STATES PATENT AND TRADEMARK OFFICE
CERTIFICATE OF CORRECTION

PATENT NO. : 7,676,373 B2
APPLICATION NO. : 12/131665
DATED : March 9, 2010
INVENTOR(S) : Kohtaroh Miyamoto et al.

Page 1 of 1

It is certified that error appears in the above-identified patent and that said Letters Patent is hereby corrected as shown below:

On the Title Page following the Prior Publication Data, add the following:

(63) Related U.S. Application Data

Continuation of application No. 11/077,586, filed on March 11, 2005, now abandoned.

(30) Foreign Application Priority Data

Mar. 12, 2004 (JP) .......................................2004-071229

In the Specification:

At column 1, after the title, add the following:

CROSS REFERENCE TO RELATED APPLICATIONS

This application is a continuation of application No. 11/077,586, filed on March 11, 2005, now abandoned, which application claims the priority benefit of Japanese application No. 2004-071229, filed on March 12, 2004, which are hereby incorporated by reference to the maximum extent allowable by law.

Signed and Sealed this
Eleventh Day of June, 2013

Teresa Stanek Rea
*Acting Director of the United States Patent and Trademark Office*